United States Patent

Means

[15] 3,665,502
[45] May 23, 1972

[54] ENERGY CONSERVING VOLTAGE CONVERTER

[72] Inventor: William A. Means, Rockford, Ill.
[73] Assignee: Applied Motors, Inc., Rockford, Ill.
[22] Filed: May 27, 1971
[21] Appl. No.: 147,371

[52] U.S. Cl. .................................321/28, 307/47, 307/77, 318/17, 321/31, 322/88
[51] Int. Cl. ..............................................H02m 7/64
[58] Field of Search ..................307/47, 77; 318/17; 321/28, 321/31, 63; 322/86, 88

[56] References Cited

UNITED STATES PATENTS 1,980,775  11/1934  Vouch ....................................322/88

Primary Examiner—William M. Shoop, Jr.
Attorney—Wolfe, Hubbard, Leydig, Voit & Osann, Ltd.

[57] ABSTRACT

An electrical motor-generator converter drawing energy from a low voltage (e.g., 12 volts) battery to operate portable electric tools or the like rated for commercially standard utility voltages (e.g., 120 volts), characterized by the feature that when the portable tool switch is turned on or off the motor-generator is started or stopped, thereby avoiding dissipation of energy during those times when the power tool is not actually being used.

11 Claims, 2 Drawing Figures

PATENTED MAY 23 1972 3,665,502

INVENTOR.
WILLIAM A. MEANS,
BY
Wolfe, Hubbard, Leydig, Voit & Osann, Ltd.
ATTORNEYS.

ENERGY CONSERVING VOLTAGE CONVERTER

BACKGROUND OF THE INVENTION

Despite the widespread availability of commercial utility electrical service, there are still many instances in which electric power tools, emergency lights and other electrical load devices need to be operated in locations remote from utility mains. For example, in roadside repair of automobiles, at construction sites, and in the event of commercial utility power failures, it may be necessary or desirable to operate electric drills, saws, sanders, service lights and various other electrical devices rated for conventional voltages such as 120 volts. Portable gasoline engine-alternator units may in some instances serve the need, but these impose the burden of supplying them with gasoline, and the possibility that after long periods of idleness the gasoline engines may refuse to start.

Since automotive vehicles (notably, repair service trucks and construction trucks) carry 12 volt batteries of appreciable storage capacity, and today have reliable systems for recharging those batteries, such vehicles may be viewed as mobile sources of electrical energy usable to operate power tools such as drills, saws, impact wrenches and the like. There is the practical difficulty, however, that electrical power tools cannot be made (and are not generally available) to operate efficiently from 12 volt electrical sources because the wire sizes necessary to accommodate the large current required at such low voltages to obtain sufficient torque or wattage would be expensive and space-consuming. On the other hand, ac./dc. universal motors are used in many conventional power tools designed to operate from the conventional 110 to 120 volt sources. Thus, there is a need for a voltage converter which can change electrical energy drawn from a low voltage source into energy at 110 to 120 volts potential —either ac. or dc. for conventional universal power tools. In those cases where power tools or load devices can only operate from 120 volts ac., then the voltage conversion should produce an alternating output voltage.

Voltage converters in the form of motor-generator sets having a motor energizable from a 12 volt battery and a generator producing 120 volts at its output may be readily constructed and manufactured as relatively compact units in the present state of the art. Such motor-generator converters are conveniently carried in the trunk or bed of an automobile or truck, thereby to provide the user with mobile electrical energy for operating —on the roadside, at construction sites or in other remote locations where utility electric service is lacking— the power tools which are normally used in the home or shop.

Generally speaking, a repairman or construction worker who uses a power tool served by a battery-powered converter carried on a vehicle, will connect the power tool to the converter output by means of a relatively long extension cord, and he will operate the power tool intermittently. This gives rise to two undesirable alternatives. If the repairman is to avoid needless energy drain on the battery, he must walk back and forth between the converter and his working location to turn the converter motor on and off during those periods of time when the power tool is to be used or left idle. Alternatively, he may let the motor of the motor-generator converter run continuously and thus waste a considerable portion of the available energy stored in the battery due to energy consumed by the motor running during those periods when the power tool and the generator are not active.

It is to the elimination of these latter difficulties that the present invention is directed.

SUMMARY OF THE INVENTION

It is the primary aim of the present invention to increase the efficiency and useful work of energy transfer to an electrical load or power tool operated intermittently through a voltage converter supplied from a battery of a given, finite storage capacity.

An important object of the invention is to provide a motor-generator voltage converter system in which the motor is automatically turned on and off when the connected electrical load device is turned on or off —thereby to obviate needless drain on a motor-energizing battery during those periods when the electrical load device is not actually being used.

A related object is to eliminate the need for a workman to walk back and forth between the voltage converter and the distant location at which he is intermittently using a power tool (connected to the converter by an extension cord) in order to turn the converter motor on and off for the purpose of reducing non-productive dissipation of energy stored in a battery supplying the converter.

Still another object is to achieve on-off switching of a motor-generator converter in response to on-off switching of a connected load device in a manner which avoids or reduces energy dissipation in the control apparatus for switching the motor on and off.

Yet another object is to enhance the overall efficiency of energy transfer from a battery through a dc. voltage converter to a dc. load —by effecting direct transfer of a portion of the electrical power from the battery itself without subjecting that portion of the power to the losses inherent in a voltage converter.

Finally, it is an object here to provide one embodiment of the invention in which the dc. voltage of a battery is converted into an alternating voltage, with the converter being turned on and off in response to on and off switching of a connected load device, and yet in which direct current components through the load device, and the deleterious effects of saturation are avoided.

DESCRIPTION OF THE DRAWINGS

Other objects and advantages of the invention will become apparent as the subsequent detailed description proceeds, taken in conjunction with the accompanying drawing, in which.

DETAILED DESCRIPTION

Figure 1:
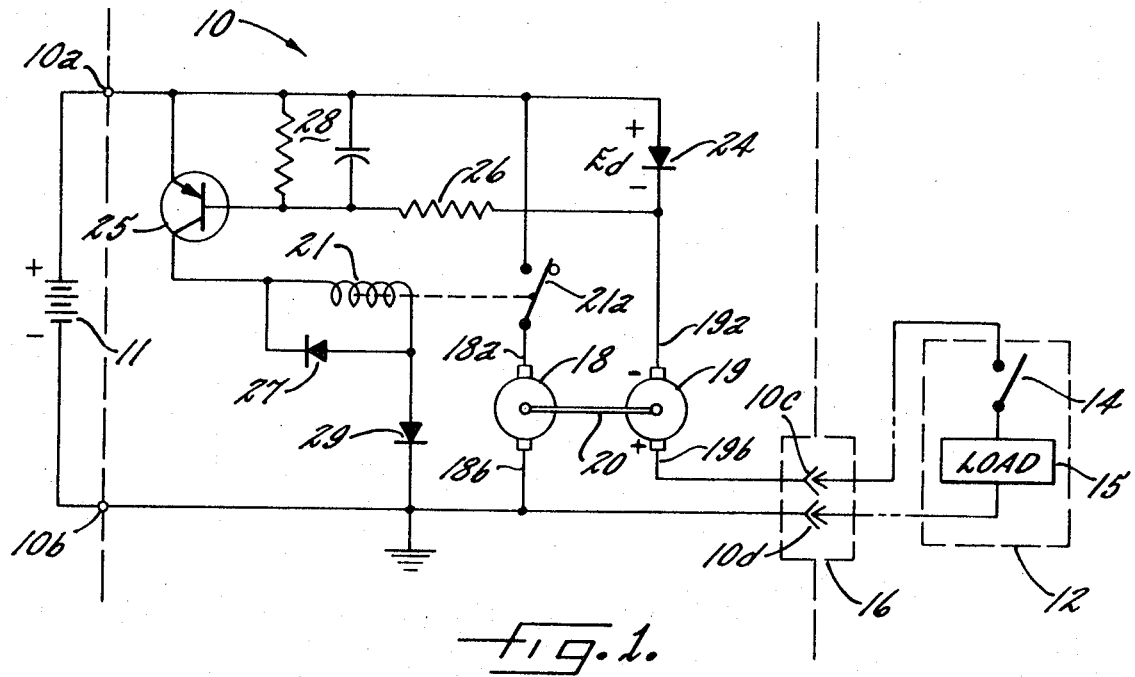
FIG. 1 is a schematic diagram of an exemplary voltage converter system embodying the features of the invention, shown in association with an energy-supplying battery and a connected load device.

While the invention has been shown and will be described in some detail with reference to particular and specific embodiments thereof, there is no intention that the invention be limited to such detail. On the contrary, it is intended here to cover all modifications, alternatives and equivalents falling within the spirit and scope of the invention as defined by the appended claims.

A preferred and exemplary embodiment of the voltage converter system 10 (FIG. 1) includes input terminals 10a, 10b adapted to be removably connected to a battery 11. The battery may typically and for example be a conventional automobile or truck battery providing an output voltage of 12 volts dc. and having a storage capacity of some 100 to 200 ampere-hours. The converter system includes output terminals 10c, 10d adapted for connection to an electrical load device 12 which consists of an on-off switch 14 and a motor, heating element, lamp or other electrically energizable unit 15. As a concrete example, the load device might be an electric power drill in which the unit 15 is a universal series motor rated for operation with an input voltage of about 120 volts ac. or dc. In the most advantageous applications of the converter system shown in FIG. 1, the load device will typically be one rated for operation with a dc. voltage appreciably different from that provided by the battery 11, and most usually rated for operation from the conventional voltage value of 120 volts. The load device 12 may be connected to the output terminals 10c, 10d by a standard plug and socket coupling 16 with a relatively long, two-conductor extension cord permitting the device to be operated at a considerable distance from the converter apparatus.

The principal converter apparatus is here shown as a motor-generator constituted by a motor 18 having input leads 18a, 18b and a generator 19 having output leads 19a, 19b. The motor and generator may be physically separate units of conventional organization with armatures mechanically coupled by a shaft 20; alternatively, they may have their rotor windings mounted on a common rotor journaled within a common stator. The term "generator" as herein used is intended generically to designate either a dc. generator or an ac. generator, and the term "alternator" will here be employed to specifically designate the latter. The motor in FIG. 1 is rated for operation from the voltage (e.g., 12 volts dc.) provided by the battery 11; whereas the generator 19 is designed and rated to produce (when driven at rated speed by the motor) an output voltage substantially corresponding to the rated operating voltage of the load device 12. For reason to be described below, it is preferable to make the generator 19 in FIG. 1 have a rated output voltage of 108 volts dc. if the load device 12 has a rated operating voltage of 120 volts dc.

To complete the converter system of the present invention, normally non-conductive switching means are provided in a first series circuit extending between the input terminals 10a, 10b through the motor 18, so that the battery 11 (when connected as shown) is in series with the switching means and the motor. More particularly, the first series circuit extends from the positive post of the battery 11 through the terminal 10a, normally open switching contacts 21a controlled by a relay coil 21, the motor 19 and the terminal 10b back to the negative post of the battery. When the contacts 21a are open or closed, the motor will be de-energized or energized by current flow from the battery 11.

A second series circuit is created between the output terminals 10c, 10d and includes the dc. generator 19, so that when a load device 15 is connected to the output terminals as shown, the generator will be in series with the on-off switch 14 and the load unit 15. More particularly, the second series circuit extends from the positive lead 19b of the generator through the output terminal 10c, the switch 14, the load unit 15, the terminal 10d, the battery 11, and a unidirectionally conductive diode 24 back to the negative lead 19a of the generator. It may be noted that the generator and battery voltages have series aiding polarities in this series circuit.

In keeping with the present invention, means are interconnected between the first and second series circuits to provide a current flow path from the battery 11 through a connected load device 12 at least momentarily after the on-off switch 14 in the latter is closed. As here shown, the battery 11 and the input terminals 10a, 10b are common to both the first and second series circuits so that when the switch 14 is closed, current may flow from the positive post of the battery through the terminal 10a, the diode 24, the generator 19, the load device 12, and the terminal 10d back to the negative post of the battery. Such current flow produces a small forward voltage drop $E_d$ of the polarity indicated across the diode 24 which serves as an impedance element for producing a signal whenever any current flows through the load device.

Further in carrying out the invention, means responsive to current flow from the battery upon closure of the load device switch 14 are provided to actuate the switching means and thereby turn on the motor 18. In the exemplary embodiment of FIG. 1, the diode 24 serves to create the forward voltage drop $E_d$ which is applied in a forward sense to the emitter-base junction of a PNP transistor 25 having its emitter and base control terminals respectively connected to the anode and cathode of the diode. A current limiting resistor 26 is preferably connected between the base of the transistor and the cathode of the diode, and a parallel R-C filter 28 is preferably connected across the emitter-base control terminals to remove the effects of noise voltage spikes. The emitter-collector terminals of the transistor 25 are connected in series with the relay coil 21 between the input terminals 10a, 10b so that the battery 11 may drive collector current through the relay coil to cause actuation and closure of the relay contacts 21a whenever the transistor is rendered conductive by the presence of the voltage $E_d$ applied to the emitter-base control terminals. A diode 27 in parallel with the coil 21 conducts to absorb the reverse voltage induced in that coil when current flow is abruptly terminated by turn-off of the transistor 25, and a diode 29 in series with the coil 21 prevents accidental forward biasing of the collector-base junction in the transistor 25.

It will thus be seen that when the switch 14 is initially closed, and current flows from the battery 11 through the diode 24 to create the forward voltage drop $E_d$, the transistor 25 is rendered conductive so that the relay coil 21 is energized to close the contacts 21a. Thereupon, the motor 18 is started and the generator 19 is rotationally driven so that its output voltage builds up to the rated value, which here is preferably 108 volts. Assuming that the switch 14 is held closed, the voltages provided by the generator 19 and the battery 11 are connected in series aiding relation with the load device 12, and the latter will thus be energized and operated at a total voltage of approximately 120 volts dc.

Appreciable currents may be drawn by the load device when it is so operating, and thus the current flow through the diode 24 may be considerably higher than that which exists at the instant the switch 14 is first closed and before the generator has been accelerated to full speed so as to produce its full output voltage. It is a characteristic of the unidirectionally conductive diode 24 that the small voltage drop thereacross (e.g., about 0.5 volts) is substantially independent of the magnitude of forward current flow therethrough. Therefore, the voltage drop $E_d$ across the diode 24 remains substantially constant as the generator voltage builds up and the current drawn by the load 12 increases. It is an important feature of the present invention that the diode 24 poled to conduct current in a forward direction supplies a substantially constant enabling voltage to the emitter-base junction of the transistor 25 irrespective of the magnitude of current supplied to the load 12. Only negligible wattage losses occur in the diode, despite the relative large current which passes through it. Moreover, the current which is drawn from the battery 12 through the collector circuit of the transistor 25 and the relay coil 21 remains at a substantially constant, relatively low value even though the generator voltage and load current increase appreciably after the instant at which the switch 14 is closed. In consequence, the transistor 25 and the relay coil 21 may be selected for operation with an applied voltage of 12 volts across the series combination which they constitute, and neither the current therethrough nor the wattage dissipated therein will increase appreciably after the switch 14 has been closed sufficiently long to permit the generator voltage and the load current to build up.

Noteworthy is the fact that the total voltage applied to the load 12 may be 120 volts which is formed by 108 volts from the generator 19 and 12 volts from the battery 11. In effect, therefore, the battery directly supplies over ten percent of the energy consumed by the load, whereas the remainder of that energy is supplied from the battery to the motor 18 where it is converted into rotational mechanical energy and thence converted by the generator into electrical energy at a higher potential. Rotational energy converters of the motor-generator type have inherent losses which limit their maximum conversion efficiency. But with the circuit here described with reference to FIG. 1, in excess of 10 percent of the energy which is supplied to the load 12 is not reduced by the efficiency limitations of the rotary voltage converter. This means that for a given energy storage capacity in the battery 11, the load device or the power tool 12 may be operated for longer periods of time and perform more useful work before it becomes necessary to recharge the battery.

In summary, it will be understood from the foregoing description of FIG. 1 that the motor 18 is turned on or off automatically whenever the load device 12 is turned on or off by closing or opening the switch 14. Thus, a workman using a load device or power tool 12 at the end of an extension cord and at a considerable distance from the converter apparatus need not be concerned with turning the motor 18 on and off during those intermittent periods when the power tool is not actually being used. When the power tool is turned off, the drain of energy from the battery 11 to operate the motor under no load conditions is eliminated. Again, this makes it possible to operate the load device for longer periods of time and to obtain more useful work therefrom before it is necessary to recharge the battery 11. The efficiency of the voltage conversion is enhanced because the battery 11 directly supplies a part of the energy consumed by the load device without that part of the energy being diminished by inherent losses in the motor-generator. Finally, the use of a unidirectionally diode 24 in series with the generator 19 and the load device 12 creates a signal, whenever and so long as the switch 14 is closed, to which the switching means constituted by the transistor 25, the relay coil 21, and the contacts 21a are responsive. Because the forward voltage drop across the diode 24 is very small and independent of the magnitude of forward current, the power or wattage losses in the switching means here shown are held to a relatively low and almost insignificant value. They do not appreciably add to the energy drain from the battery 11.

Figure 2:
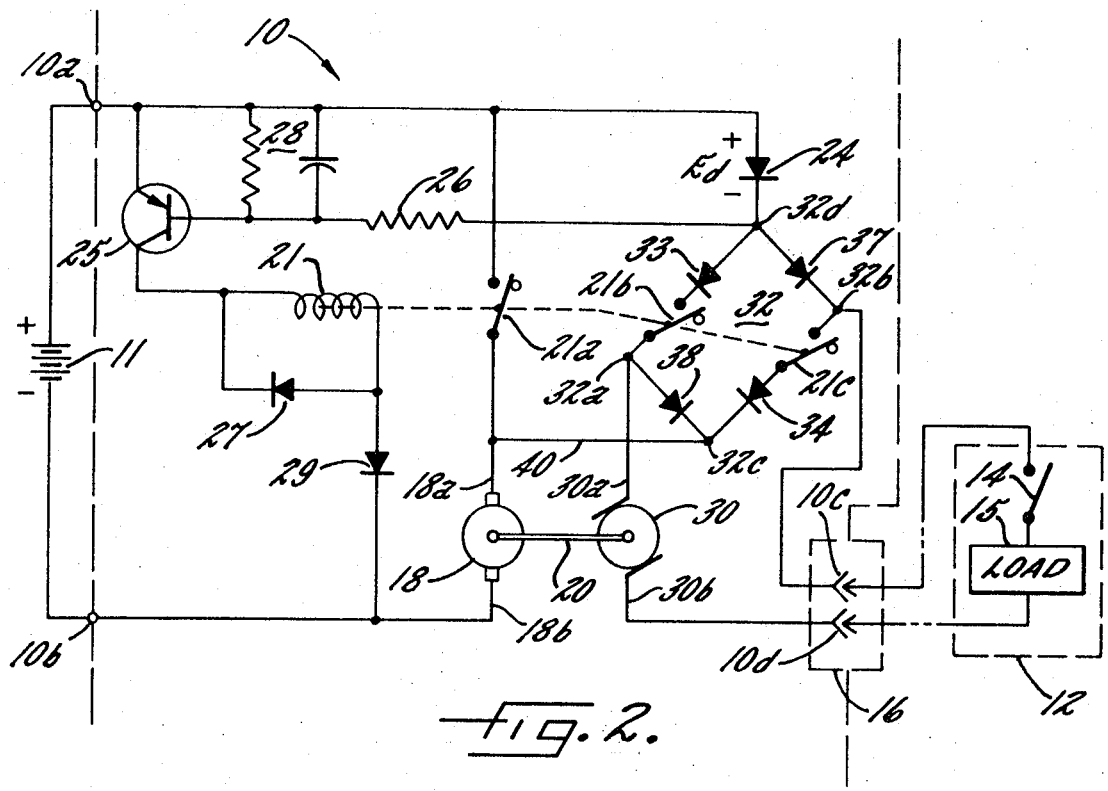
FIG. 2 is similar to FIG. 1 but illustrates a second embodiment of the invention.

Because the second exemplary embodiment shown in FIG. 2 is in general similar to that of FIG. 1, like reference characters are employed in both figures to identify like elements, and only the differences between the two embodiments need to be specifically described. In FIG. 2, the generator is an alternator 30 having output leads 30a, 30b adapted to supply alternating voltage and current to the load device 12. Provision is made to pass direct current from the battery 11 through the generator and load device when the on-off switch 14 is initially closed— and such current flow creates a forward voltage drop $E_d$ across an impedance element here constituted by the diode 24 to turn on the transistor 25 and pick up the relay 21. But continued flow of dc. current through the load is eliminated after the motor builds up to speed and the alternator voltage rises from zero to its rated value, so that saturation of a transformer or an induction motor (which may constitute the load unit 15) is avoided.

As will be apparent, a first series circuit is established in FIG. 2 from input terminal 10a through the normally open relay contacts 21a and the motor 18, in order that closure of those contacts energizes the motor from the connected battery 11. The energization of the relay coil 21 is controlled by the transistor 25 which is responsive to the presence or absence of a voltage drop $E_d$.

To produce forward current flow through the diode 24 from the battery 11 when the on-off switch 14 in the load device 12 is initially closed, a dc. current path is created from the positive post of the battery 11 through input terminal 10a, diode 24, a rectifier diode 37 to the terminal 10c, thence through the load device 12, the terminal 10d, the alternator 30, a rectifier diode 38, a conductor 40, thence through the motor 18 and the terminal 10b to the negative post of the battery 11. Upon closure of the switch 14, dc. current will flow momentarily and the transistor 25 will be turned on to energize the relay coil 21 which actuates and closes the contacts 21a. Thereupon, the motor 18 starts and the alternator voltage quickly builds up.

Provision is made to create a second series circuit between the terminals 10c, 10d —and thus which includes the connected load device 12— through the alternator 30 and the diode 24, so that current drawn from the alternator through the load maintains the forward voltage drop $E_d$ across the diode 24, thereby assuring that the relay 21, 21a remains picked up. To accomplish this, the forward current through the diode 24 must be relatively steady or at least of a pulsating dc. nature even though the current flowing through the alternator and the load device is of an alternating waveform. In the embodiment of FIG. 2, a fullwave rectifier bridge 32 is constituted by the rectifier diodes 37 and 38 together with diodes 33 and 34 which are coupled in to complete the bridge upon closure of normally open relay contacts 21b and 21c controlled by relay coil 21. In other words, the contacts 21b, 21c normally condition the bridge 32 to constitute two diodes 37, 38 in series with the load device 12 so that initially after closure of switch 14 current must flow from the battery 11 through diode 24 and the load device. But these contacts serve also as means actuated by the relay coil 21 to change the bridge into an operative fullwave rectifier with input terminals 32a, 32b and output terminals 32c, 32d. With the relay 21 actuated and the contacts 21b, 21c closed, the alternator 30 supplies alternating voltage and current to the load 12 but the load current appears as a pulsating dc. current passing forwardly through the diode 24. More specifically, during positive half cycles of the voltage generated in the alternator 30 and when the lead 30a is positive relative to lead 30b, current flows in a series path which includes the elements 38, 40, 21a, 24, 37, 10c, 14, 15, 10d and back to the negative alternator lead 30b. Conversely, on negative half cycles when the alternator lead 30b is positive relative to the lead 30a, current flows in a series path which sequentially includes the elements 10d, 15, 14, 10c, 21c, 34, 40, 21a, 24, 33, 21b, and thus back to the alternator lead 30a. The fullwave rectifier bridge therefore causes the alternating current flow from the alternator through the load 12 to pass always forwardly through the relatively low forward impedance of the diode 24, and the forward voltage drop across the latter thus is of a pulsating dc. nature. If it is assumed that the motor drives the alternator at a speed which causes the latter to produce a voltage at 60 cycles per second, the direct current pulsations through the diode 24 will recur at a rate of 120 per second. Thus, the transistor 25 is repeatedly pulsed into a conductive state, and the relay 21 remains picked up because its electrical and mechanical inertia will not permit its contacts to drop out in between the individual pulses of current passed through the coil 21. In other words, the relay 21 is purposely chosen to have a relatively slow dropout time, and it will remain actuated when the coil is energized with pulsating current having a frequency on the order of 120 cycles per second.

It is to be noted that when the contacts 21a initially close in response to closure of the switch 14 (and the contacts 21b, 21c simultaneously close) the contacts 21a form a shunt in parallel with the series combination of the diodes 24 and the output terminals 32d, 32c of the bridge 32. Thus, dc. current from the battery 11 —which might otherwise flow (as it does during start-up) through the diode 24, the rectifier 37 and thence via the output terminal 10c through the load device 12, the alternator 30 and the diode 38 back to the conductor 40 and thence through the motor 18 —does not occur, because such current may pass directly through the substantially zero resistance shunt formed by the closed relay contacts 21a. This is an important feature of the FIG. 2 embodiment because after the motor 18 has been started by actuation of the relay 21, and the alternator 30 builds up its voltage to supply ac. current to the load 12, substantially no dc. current passes through the load device 12. Thus, if the load device is one which includes inductive elements (e.g., a transformer or an induction motor), dc. saturation of such inductive elements is avoided. Despite the advantage that dc. saturation of a load device designed for operation on alternating voltage and current is avoided, the converter system shown in FIG. 2 functions successfully to turn the motor 18 on and off automatically when the load device 12 is turned on or off by closing or opening the switch 14 located at or in the load device.

It is to be observed that when the relay 21 picks up to close the contacts 21a immediately after the switch 14 is closed (as above described), the relay contacts forms a shunt which prevents continued flow of dc. current from the battery through the diode 24 and the load device. Thus, immediately after the relay 21 picks up, the forward voltage drop across the diode 24 momentarily disappears, the transistor 25 is turned off, and current flow through the relay coil is terminated. Ordinarily, this would cause the relay 21 to drop out immediately, so that the circuit would operate with a "doorbell action" to make the relay repeatedly pick up and drop out. That effect, however, does not occur in the system illustrated by FIG. 2 because the relay 21 is chosen to have a significant time delay of dropout. In other words, when the relay 21 is picked up, its contacts will deactuate only after a significant delay from the instant that energizing current through the coil 21 ceases. If desired, the relay 21 may be chosen to have a time delay dropout mechanism such as a pneumatic or hydraulic dashpot, but generally any relay with a slow dropout characteristic will suffice. Thus, in actual operation, when the relay 21 picks up in response to current flow from the battery 11 through the load device 12 when the switch 14 is initially closed, the motor 18 will reach a sufficient speed and the alternator 30 will build up its generated voltage to a sufficiently high value so that ac. current through the load will produce the pulsating voltage drop across the diodes 24, as above described, before the relay 21 drops out. Thereafter, it is the load current flowing through the diode 24 and the resulting pulsating voltage $E_d$ which periodically renders the transistor 25 conductive and maintains the relay 21 in an actuated condition. Of course, when the operator turns off the load device 12 by opening the switch 14, load current ceases to flow, so that the pulsating voltage drop across the diode 14 disappears, and the relay 21 after a short period is deactuated to open the contacts 21a and thus to turn off the motor 18.

From the foregoing, it will be seen that the present invention brings to the art a voltage converter system in which a workman may cause the motor of a motor-generator set to be turned on and off automatically in response to his turning a remotely connected load device 12 on or off. The motor 18 thus does not run and needlessly draw energy from the battery 11 during those intermittent periods when the workman is not actually using the load device 12, and therefore more useful work may be obtained from the load device before recharging of the battery 11 is required. Moreover, the motor 18 is maintained in its energized condition by load current flow through an impedance element to produce a control signal or voltage drop; and in the present instance that impedance element is constituted by the non-linear forward impedance of the diode 24 which results in the voltage $E_d$ remaining at a relatively low value even as the load current increases to a relatively high value. In consequence, the power dissipation in the diode 24, even though it carries relatively high load currents, is kept to a very reasonable and low value, and neither the diode 24, the transistor 25 nor the relay coil 21 use up an appreciable amount of the energy stored in the battery 11. Finally, in the dc. generator system of FIG. 1, the efficiency of energy conversion is enhanced because a part of the power transmitted to the load device is supplied directly from the battery 11 without conversion in the motor generator set. The alternator converter embodiment of FIG. 2 is characterized by the special advantage that undesirable saturating dc. currents are not transmitted through the load device when the latter is operating.

I claim as my invention:

1. In a voltage converter having input terminals adapted for connection to a low voltage battery and output terminals adapted for connection to an electrical load device having an on-off switch, the combination comprising
   a. a motor-generator set with motor input leads and generator output leads,
   b. switching means connected in a first circuit with said motor leads between said input terminals, so that the motor and switching means are in series with a battery when the latter is connected to said input terminals,
   c. means connecting said generator output leads in a second circuit with said output terminals, so that the generator is in series with a load device and its on-off switch when such device is connected to the output terminals,
   d. means interconnected between said first and second circuits for providing a current flow path from a connected battery through a connected load device at least momentarily after the on-off switch of the latter is closed, and
   e. means responsive to current flow in said path for actuating said switching means to complete said first circuit and start said motor, thereby to drive the generator so it energizes said load and whereby the motor runs only during those time periods when said on-off switch is closed.

2. In a voltage converter system, the combination comprising
   a. a low voltage battery,
   b. a motor-generator set having a motor rated for operation from the low voltage of said battery and a generator rated to produce an output voltage appreciably greater than that of said battery,
   c. a load device having a series on-off switch,
   d. normally open switching means connected in series with said motor and said battery,
   e. means connecting said generator in series with said load device and its on-off switch,
   f. means responsive to current flow through said load device for actuating said switching means to energize said motor, whereby said motor is energized only when said on-off switch is closed,
   g. means for passing current from said battery through said load device at least momentarily after closure of said on-off switch to initiate energization of said motor, and
   h. means for continuing current flow through said load device so long as said generator is producing its output voltage and said on-off switch is closed.

3. In a voltage converter having input terminals adapted for connection to a low voltage battery and output terminals adapted for connection to an electrical load device rated for operation from a higher voltage and having an on-off switch, the combination comprising
   a. a motor-generator set including
      a1. a motor having input leads and rated for energization from the voltage of said battery, and
      a2. a generator having output leads and rated to produce a high generated voltage corresponding substantially to the rated operating voltage of said load device;
   b. normally open switching means connected in a first series circuit with said motor input leads between said input terminals, so that the motor and switching means are in series with a battery connected to said input terminals,
   c. a unidirectionally conductive diode having the characteristic of a forward voltage drop which is substantially independent of the forward current flow therethrough,
   d. means connecting said generator output leads in a second series circuit between said output terminals so that said generator is in series with a load device and its on-off switch when such device is connected to said output terminals, said series circuit including
      d1. means for routing current drawn from said generator through said load device in a forward direction through said diode;
   e. means responsive to closure of said on-off switch in a connected load device for drawing current from said battery forwardly through said diode at least momentarily after said on-off switch is closed; and
   f. means responsive to a forward voltage drop across said diode for actuating said switching means to energize said motor from said battery;
   whereby said motor-generator runs only when and so long as the on-off switch in a connected load device is closed.

4. The combination set forth in claim 3 further characterized in that said switching means includes a transistor having its emitter-base control terminals connected across said diode and its emitter-collector terminals connected in series with said battery, together with means responsive to collector current through the transistor for establishing a current flow path from said battery through said motor, said collector current thereby remaining substantially constant as load current flow through said diode increases.

5. In a voltage converter having input terminals adapted for connection to a low-voltage battery and output terminals adapted for connection to an electrical load device rated for operation from a substantially higher dc. voltage and having an on-off switch, the combination comprising
   a. a motor generator set including
      a1. a dc. motor having input leads and rated for energization from the voltage of said battery, and
      a2. a dc. generator having output leads and rated to produce a high dc. voltage corresponding substantially to the rated operation voltage of said load device;
   b. normally open switching means connected in a first series circuit with said motor between said input terminals, so that said motor and switching means are in series with a battery connected to said input terminals,
   c. means providing a second series circuit including said generator and battery between said output terminals, so that said battery, generator and a load device and its on-off switch are in series when such device is connected to said output terminals, and with the battery poled in series-aiding relation to the dc. output voltage of the generator, and
   d. means responsive to current flow in said series circuit, produced by either the voltage of said battery or the voltage of said generator whenever said on-off switch is closed, for actuating said switching means to energize said motor from the battery;
   whereby the motor is turned on or off in response to closing or opening of said on-off switch and the voltage applied to said load device when the on-off switch is closed is the sum of the battery and generator voltages.

6. The combination set forth in claim 5 further characterized in that said means (d) is a unidirectionally conductive diode which has a forward voltage drop, when conducting forward current, which is substantially independent of the magnitude of such current, said diode being connected in said series circuit and poled to conduct in a forward direction current drawn by the load device, and means responsive to the presence of a forward voltage drop across said diode for actuating said switching means.

7. In a voltage converter having input terminals adapted for connection to a battery and output terminals adapted for connection to an electrical load device having an on-off switch and rated for operation from an ac. voltage, the combination comprising
   a. a motor-alternator set including
      a1. a dc. motor having input leads and rated for energization from the voltage of said battery, and
      a2. an alternator having output leads and rated to produce an ac. voltage corresponding substantially to the rated operation voltage of said load device;
   b. normally non-conductive switching means connected in a first series circuit with said motor input leads between said input terminals,
   c. a second series circuit extending between said output terminals and including said alternator, a full wave rectifier bridge, and an impedance element;
   d. means interconnecting said first and second circuits for creating a dc. current flow path from said one of said input terminals through said impedance element, said bridge, and any load device (when the on-off switch thereof is closed) connected to said output terminals, and said alternator back to the other of said input terminals; and
   e. means responsive to the flow of current through said impedance device for actuating and rendering conductive said switching means,
   whereby closing and opening of the on-off switch in a load device connected to said output terminals automatically and respectively energizes and deenergizes said motor from a battery connected to said input terminals.

8. The combination set forth in claim 7 further characterized in that said impedance element is a unidirectionally conductive diode having a forward voltage drop which remains substantially constant even though forward current therethrough varies over a wide range.

9. The combination set forth in claim 8 further characterized in that said switching means includes a transistor having its control terminals connected across said diode and its main current terminals connected in series with a relay coil between said input terminals, the contacts of said relay being in series with said motor between said input terminals.

10. The combination set forth in claim 7 further characterized in that said second series circuit includes the normally non-conductive switching means which are connected in said first series circuit, whereby upon conduction of said switching means no appreciable dc. current flows from a battery connected to said input terminals through a load device connected to said output terminals.

11. The combination set forth in claim 9 further characterized in that said relay contacts are in parallel with the series combination of said diode and the output terminals of said bridge, means normally conditioning said bridge to constitute two diodes in series with said load device, and means actuated by said relay to change said bridge into an operative full wave rectifier.

* * * * *